(12) United States Patent
Gieseke

(10) Patent No.: US 6,467,342 B1
(45) Date of Patent: Oct. 22, 2002

(54) APPARATUS FOR MEASURING VELOCITY OF A PROJECTILE

(75) Inventor: Thomas J. Gieseke, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 66 days.

(21) Appl. No.: 09/652,836

(22) Filed: Aug. 30, 2000

(51) Int. Cl.⁷ .................................................. G01L 5/14
(52) U.S. Cl. ............................. 73/167; 73/162; 73/167; 324/178
(58) Field of Search ..................... 73/162, 167; 324/178

(56) References Cited

U.S. PATENT DOCUMENTS

| | | | | |
|---|---|---|---|---|
| 3,792,354 A | * | 2/1974 | Slaght et al. | 324/178 |
| 5,531,113 A | * | 7/1996 | Jamison | 73/167 |
| 5,713,239 A | * | 2/1998 | Kirschner | 73/167 |
| 5,778,725 A | * | 7/1998 | Kirschner et al. | 73/167 |

OTHER PUBLICATIONS

Disclosed prior art. Figs. 1–3.*

* cited by examiner

*Primary Examiner*—Hezron Williams
*Assistant Examiner*—Andre' K. Jackson
(74) *Attorney, Agent, or Firm*—Michael J. McGowan; Michael F. Oglo; James M. Kasischke

(57) ABSTRACT

An apparatus for measuring velocity of a projectile includes a plurality of break-screens aligned with each other serially and along a line of travel of the projectile, and parallel to each other, and spaced from each other and from a projectile firing device by selected distances. Each break-screen includes a support sheet and an electrically conductive wire mounted on the sheet so as to be interrupted by passage of the projectile through the sheet. A single amplifier is in communication with each of the conductive wires and is adapted to provide an indication as to a change in voltage in each of the break-screens upon passage of the projectile therethrough, and an indication as to time of the passage. A data collection/display apparatus computes therefrom the velocity of the projectile.

8 Claims, 4 Drawing Sheets

FIG. 5
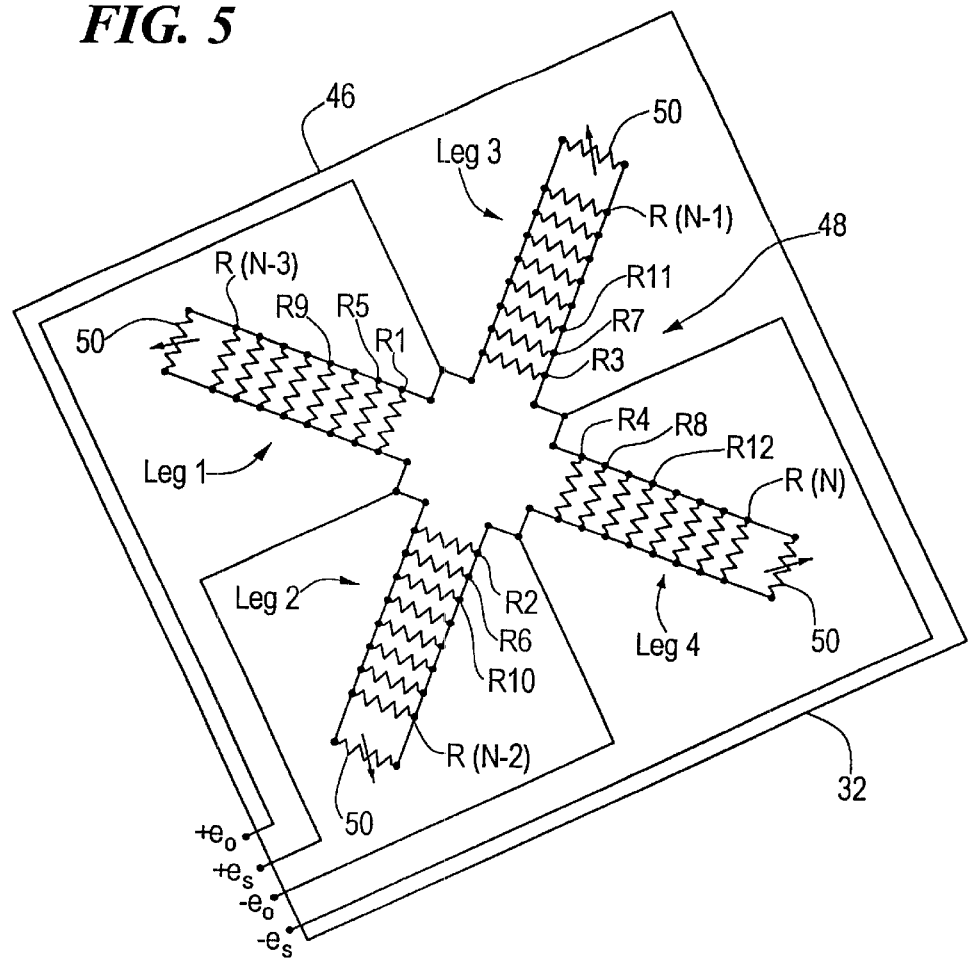
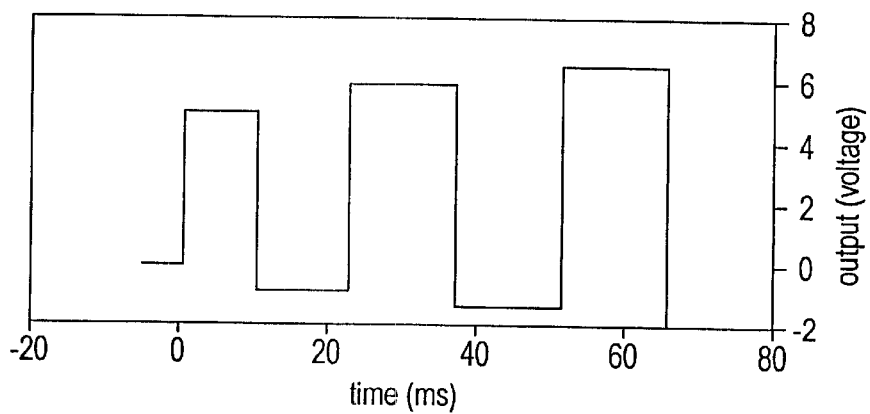
FIG. 7

APPARATUS FOR MEASURING VELOCITY OF A PROJECTILE

STATEMENT OF GOVERNMENT INTEREST

The invention described herein may be manufactured and used by or for the government of the United States of America for governmental purposes without payment of any royalties thereon or therefor.

BACKGROUND OF THE INVENTION

1. Field of the Invention

The invention relates to the testing of firearms and is directed more particularly to measuring velocities of projectiles, such as bullets.

2. Description of the Prior Art

Until recently, it has not been feasible to shoot bullets underwater. Currently, however, supercavitation drag reduction allows bullets to be fired underwater at velocities sufficient to inflict damage on a target, explode mines, and the like.

It is known to measure velocities of bullets fired underwater. A fired bullet passes through a number of motion detector sensors in a sequential manner, the sensors being generally aligned with the expected trajectory of the bullet.

In U.S. Pat. No. 5,778,725, issued Jul. 14, 1998, in the names of Ivan N. Kirschmer et al, there is shown and described an assembly for testing an underwater gun. The assembly includes motion detector sensors, each comprised of a coil of copper windings in alignment with the expected trajectory, such that a tested bullet passes through the coils in its passage through the assembly. When the test bullet, which may be provided with a magnet, passes through a coil, such passage generates an electromotive force in the coil which is passed to a timer recording device. The timer recording device, in addition to recording the time of passage of the bullet, and having programmed therein the distance between sensors, determines the velocity of the bullet between each two sensors.

Referring to FIG. 1, It will be seen that a known motion sensor 20 comprises a thin support sheet 22 of plastic, or the like, retained in a rigid frame 24. An electrically conductive wire 26 is mounted on the sheet 22, as by printed circuit membrane methods, and is arranged such that a bullet passing through the sheet 22 will necessarily interrupt the wire 26 in one or more bullet hole areas 28. The sheet 22, frame 24, and wire 26 combination is generally referred to as a "break-screen" 30. The conductive wire 26 is in communication with a power supply and amplifier device 32 which, in turn, is in communication with a data collection/display apparatus 34 which provides an indication as to the times at which the break-screens are sequentially broken, and computes therefrom the time taken for the bullet to travel between break-screens 30, and, therefrom, the velocity of the projectile.

Referring to FIGS. 2 and 3, it will be seen that the above-described assembly may include a series of sequentially arranged break-screens 30 placed in a water container 36, such as a test tank or natural pond, or the like. The break-screens 30 are placed in an expected trajectory 38 of a bullet, or other projectile, fired from a gun 40. In a test tank, an array 42 of break-screens 30 may be mounted on carriage rails (not shown), or the like, normally provided in test tank assemblies. In a pond, or the like, the array 42 of break-screens 30 may be suspended from a floating barge 44, or other vessel.

A shown in FIG. 3, each break-screen 30 is provided with an amplifier 32, each of the amplifiers 32 being adapted for connection to the collection/display apparatus 34.

Inasmuch as the array 42 may include from two to forty-eight, or more, break-screens, it is deemed beneficial to remove the amplifiers 32 from the break-screens 30, such that the requirement of large numbers of amplifiers for a given assembly is eliminated and the handling of break-screens, comprising only the sheet 22, wire 26 and frame 24, is simplified.

SUMMARY OF THE INVENTION

An object of the invention is, therefore, to provide an apparatus for measuring the velocity of a projectile, the apparatus including a selected number of break-screens and a single common amplifier for all of the break-screens.

With the above and other objects in view, as will hereinafter appear, a feature of the present invention is the provision of an apparatus for measuring velocity of the projectile, the apparatus comprising a plurality of break-screens aligned with each other serially and along a line of travel of the projectile, and parallel to each other, and spaced from each other and from a projectile firing device by selected distances. Each of the break-screens comprises a support sheet and an electrically conductive wire mounted on the sheet so as to be interrupted by passage of the projectile through the sheet. An amplifier is in communication with each of the conductive wires and is adapted to provide an indication as to a change in voltage in each of the break-screens upon passage of the projectile therethrough, and an indication as to time of the passage. A data collection/display apparatus provides an indication as to the times at which the break-screens are broken, from which there is computed the velocity of the projectile.

The above and other features of the invention, including various novel details of construction and combinations of parts, will now be particularly described with reference to the accompanying drawings and pointed out in the claims. It will be understood that the particular apparatus embodying the invention is shown by way of illustration only and not as a limitation of invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention from which its novel features and advantages will be apparent, wherein corresponding reference characters indicate corresponding parts throughout the several views of the drawings and wherein:

FIG. 5 is a schematic diagram of an amplifier circuit portion of the apparatus of FIG. 4;

FIG. 7 is a graph depicting penetration of the break-screens against the passage of time, which leads to computation of velocity of a projectile passing through the apparatus.

DESCRIPTION OF THE PREFERRED EMBODIMENTS

Figure 4:
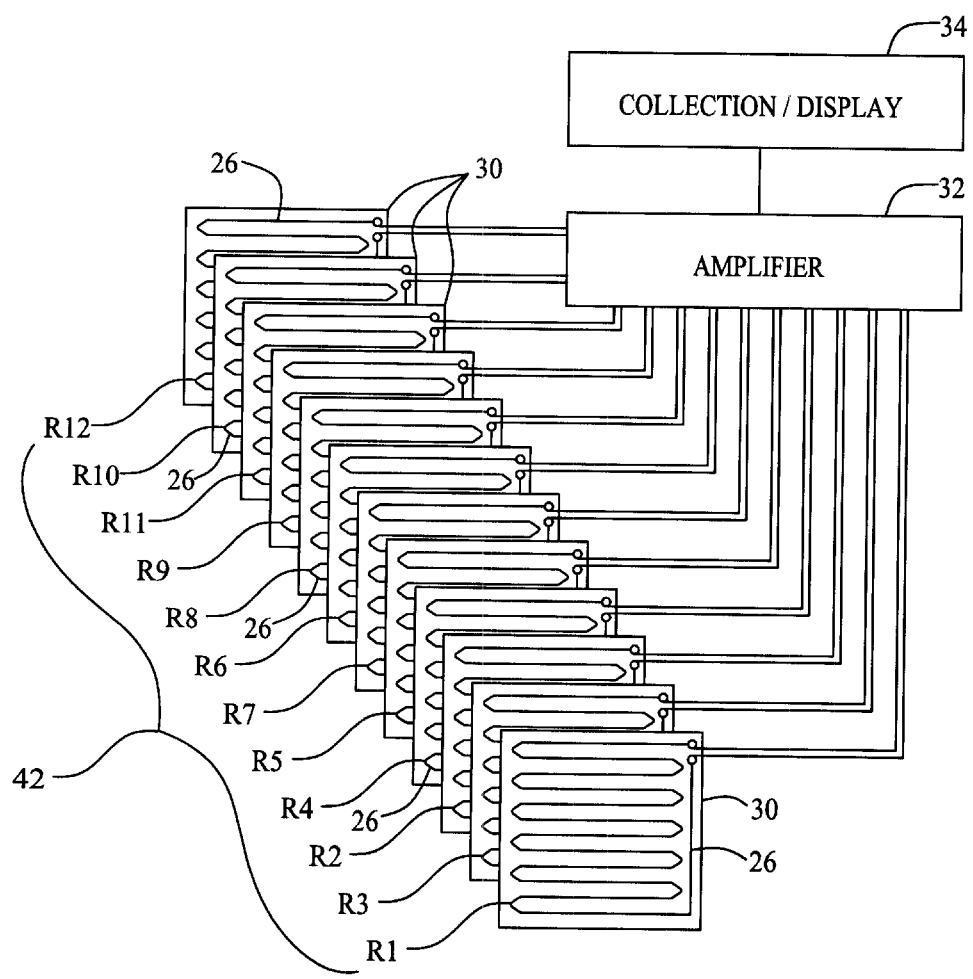
FIG. 4 is similar to FIG. 3, but shows one form of apparatus illustrative of an embodiment of the invention.

Referring to FIG. 4, it will be seen that an illustrative apparatus includes an array 42 of twelve break-screens 30, each in communication with a single common amplifier 32 which, in turn, is in communication with a collection/display apparatus 34. The break-screen wires 26 are merely "plugged in," by way of known electrical connectors (not shown), to the amplifier 32, which may be adapted to receive any selected number of the break screen connectors.

Referring to FIG. 5, it will be seen that in the amplifier 32 there is disposed circuitry 46 which is complementary to the break-screen wires 26, which are depicted as resistors R1–R12, and which accommodates a relatively large number of break-screens. Referring back to FIG.4, the wires 26 of the twelve break-screens 30 are identified as resistors: R1, R3, R2, R4, R5, R7, R6, R8, R9, R11, R10, and R12. In FIG.5, the amplifier circuitry 46 includes these resistors arranged in various "legs" 1–4, forming a Wheatstone bridge 48. A balancing resistor 50 is added to each leg to compensate for variations in the breakscreen resistances.

To operate the bridge circuit 46, a supply voltage is applied to $+e_s$ and $-e_s$ terminals, using any bridge amplification unit. The balance resistors 50 are adjusted so that the product of the net resistances of leg 1 and leg 3 is equal to the product of the net resistances of leg 2 and leg 4. The output voltage, i.e., the voltage difference between $+e_o$ and $-e_o$ is zero under these conditions and the bridge 48 is balanced.

Figure 1:
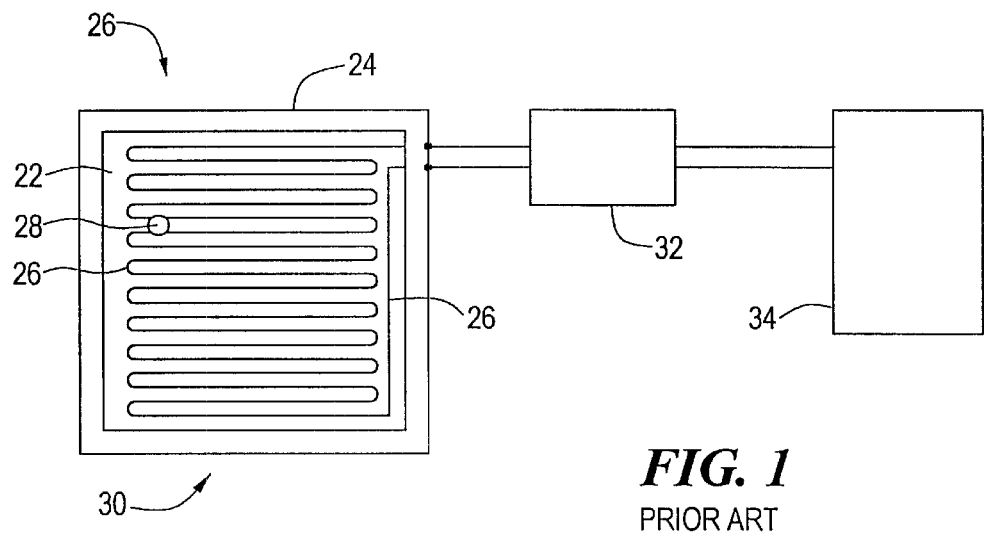
FIG. 1 is a diagrammatic illustration of a single known break-screen portion of an apparatus for measuring velocity of a projectile, in combination with an amplifier and data collection/display apparatus.
Figure 2:
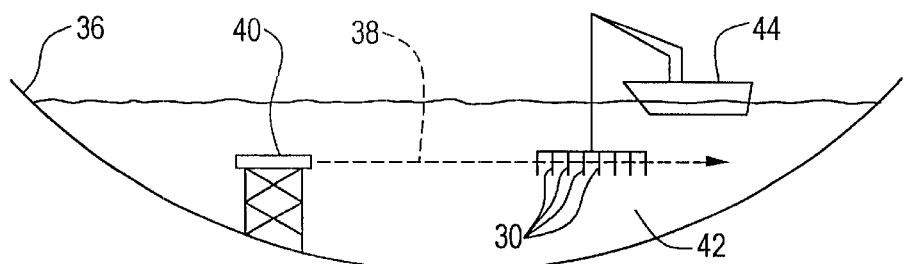
FIG. 2 is a diagrammatic illustration of the manner in which break-screens of the type shown in FIG. 1 are used.
Figure 3:
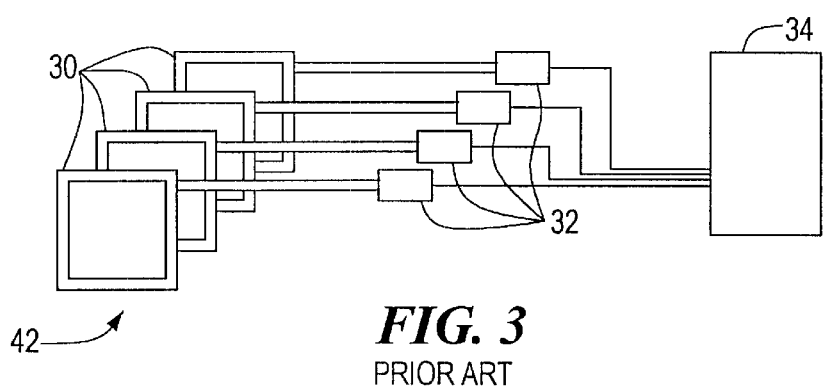
FIG. 3 is a further diagrammatic illustration of the use of break-screens of the type shown in FIG. 1.

In operation, within microseconds after firing the gun 40, a bullet pierces the first break-screen 30, as shown in FIG. 1 at 28, which breaks the wire 26, which in the first break-screen 30 constitutes resistor R1 in FIGS. 4 and 5. Thereafter, the bullet passes through, in order, resistances R3, R2, R4, R5, R7, R6, R8, R9, R11, R10, and R12. In the Wheatstone bridge 48, the breaking of resistor R1 causes an imbalance in the output voltage. When the bullet breaks the second break-screen, R3 is broken, and the bridge becomes nominally balanced again, with the output voltage returning to zero. The process is repeated as R2 and R4 are broken, followed by R5 and R7, R6 and R8, R9 and R11, and R10 and R12. The output from the circuit 46 is a square wave with each rising and falling edge representing the rupture of break-screens 30. In FIG. 7 there is shown the output from the collection/display apparatus 34, based upon the operation of the bridge 48.

In this manner, a single compact amplifier accommodates a system in which twelve amplifiers previously were used. While in FIG. 4, an array 42 of twelve break-screens 30 is illustrated, it is clear from FIG.5 that any desired number of additional break-screens may be accommodated, their wires 26 designated for illustrative purposes, R(N-3), R(N-2), R(N-1), and R(N) in FIG.5. In practice, such an arrangement has been used including the equivalent of forty-eight amplifiers.

As noted hereinabove, the array 42 may include only two break-screens 30. In the course of conducting tests in ponds, and the like, as opposed to test tanks, when the array 42 is suspended from a barge 44, or other vessel, it has become apparent that using one array for a relatively large number of tests is beneficial, eliminating time required to repeatedly raise arrays, replace break-screens, and lower arrays back into test position.

For such instances, there are provided panels 60a, 60b (FIG.6), each containing a selected number of break-screens 30 mounted side-by-side, edge-to edge. In the embodiment shown in FIG.6, each panel includes forty-nine break-screens 30, each 2 ft.×2 ft. The screens are arranged in legs 1–4, corresponding to the legs of the Wheatstone bridge 48. The break-screens 30 in the two panels 60 are arranged such that the sequence of penetration is the same as noted above with respect to the embodiment shown in FIG.4. A bullet passing through the wire 26 designated R1 in the first panel 60a, leg 1, in FIG. 6, will thereafter pass through the wire 26, designated R3 in the second panel 60b, leg 3. Referring again to FIG. 5, it will be seen that the breaking of R1 in leg 1, followed by the breaking of R3 in leg 3, will imbalance and then rebalance the circuit 46. The pairings of the break-screens 30 continue, that is, R2 in panel 60a is aligned with R4 (not visible in FIG. 6) in panel 60b; R5 in panel 60a is aligned with R7 in panel 60b; R6 in panel 60a is aligned with R8 (not visible) in panel 60b; R9 is aligned with R11 and R10 with R12 (not visible). Any even number of panels containing any number of screens may be used to configure a target suitable for a particular application, the fundamental requirement being that the bridge circuit be unbalanced and then rebalanced by the sequential breaking of screens.

Figure 6:
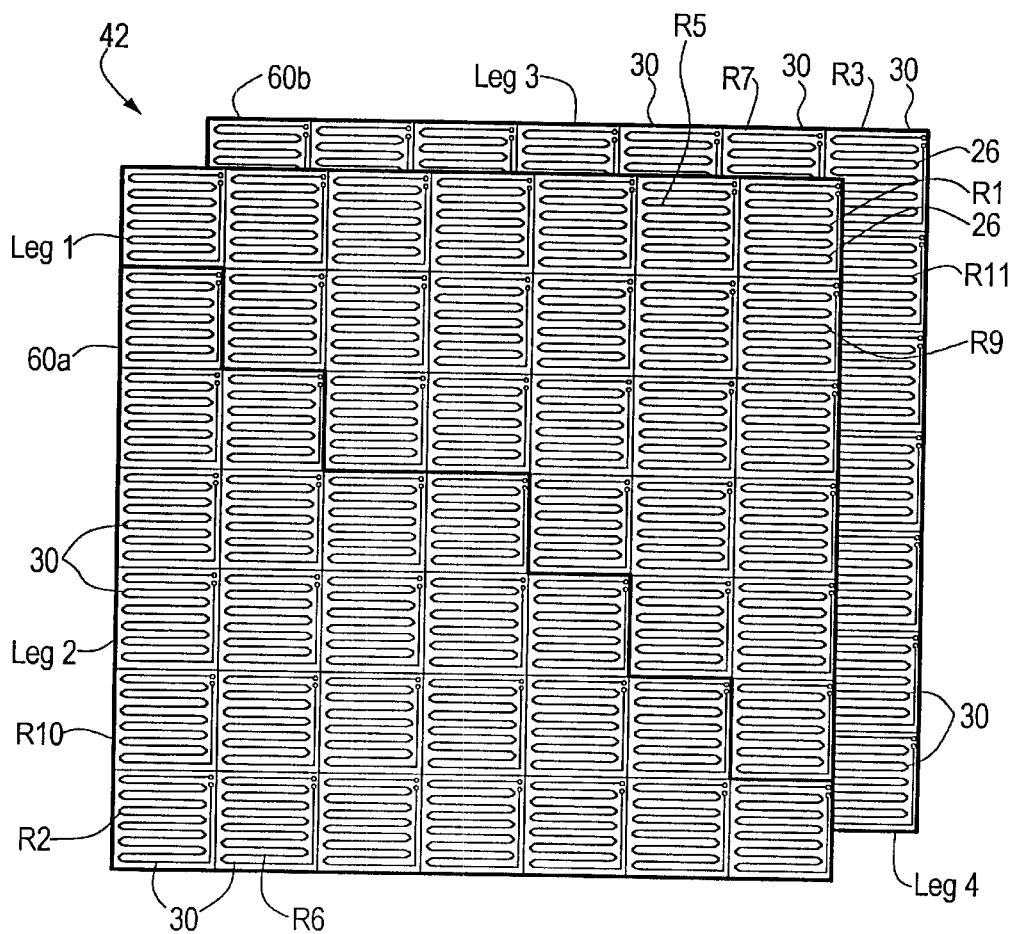
FIG. 6 is a diagrammatic illustration of an alternative embodiment of the invention.

Thus, the arrays of break-screens of both the FIG.4 and FIG. 6 embodiments are "read" by the one common amplifier 32.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. Apparatus for measuring velocity of a projectile, the apparatus comprising:

a plurality of break-screens aligned with each other serially and along a line of travel of the projectile, and parallel to each other, and spaced from each other and from a projectile firing device by selected distances, each break-screen comprising a supporting sheet, and an electrically conductive wire mounted on said sheet so as to be interrupted by passage of the projectile through the sheet;

a single amplifier in communication with each of said conductive wires and adapted to provide an indication as to a change in voltage in each of said break-screens upon passage of the projectile therethrough, and an indication as to time of the passage, said amplifier being provided with a Wheatstone bridge circuit in which resistances of the circuit comprise said electrically conductive wires mounted on said break-screens; and a data collection apparatus in communication with said amplifier for providing an indication as to the times at which said break-screens are sequentially broken, and computing therefrom the time taken for the projectile to travel between said break-screens, and therefrom the velocity of the projectile;

wherein:

the electrically conductive wire mounted on a first of said break-screens contacted by the projectile comprises a first of the resistances of a first leg of the Wheatstone bridge, interruption of the first resistance unbalancing voltage output of the Wheatstone bridge, and the electrically conductive wire mounted on a second of said break-screens contacted by the projectile comprises a second of the resistances of a second leg of the Wheatstone bridge, interruption of the second resistance rebalancing voltage output of the Wheatstone bridge.

2. The apparatus in accordance with claim 1 wherein passage of the projectile through subsequent pairs of break-screens serves to sequentially unbalance and rebalance the voltage output of the Wheatstone bridge.

3. The apparatus in accordance with claim 1 wherein each of said break-screens comprises one of a plurality of break-screens mounted side-by-side in a panel of break-screens.

4. The apparatus in accordance with claim 3 wherein the electrically conductive wires in a first of the panels of break-screens comprise the resistances of the first and second legs of the Wheatstone bridge, and the electrically conductive wires in a second of the panels of break-screens comprise the resistances of third and fourth legs of the Wheatstone bridge.

5. The apparatus in accordance with claim 1 wherein said break-screens are disposed underwater for measuring the velocity of the projectile fired underwater.

6. Apparatus for indicating passage of a projectile comprising:

a plurality-of supporting sheets;

at least one conductive wire mounted on each said supporting sheet, said conductive wire being separable by passage of a projectile;

said conductive wires on at least two of said plurality of supporting sheets being joined together in at least one Wheatstone bridge circuit wherein separation of one said conductive wire on a first supporting sheet unbalances the resistance of said circuit and separation of another said conductive wire on a second supporting sheet restores balance to said circuit.

7. The apparatus in accordance with claim 6 further comprising an amplifier in communication with said Wheatstone bridge circuit.

8. The apparatus in accordance with claim 7 further comprising a data collection apparatus in communication with said amplifier.

* * * * *